(12) United States Patent
Marconato (10) Patent No.: US 10,041,966 B2
(45) Date of Patent: Aug. 7, 2018

(54) METHOD FOR ESTIMATING THE SPEED OF AN ENGINE IN A PREDEFINED POSITION

(71) Applicants: CONTINENTAL AUTOMOTIVE FRANCE, Toulouse (FR); CONTINENTAL AUTOMOTIVE GMBH, Hannover (DE)

(72) Inventor: Benjamin Marconato, Toulouse (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 524 days.

(21) Appl. No.: 14/429,868

(22) PCT Filed: Aug. 26, 2013

(86) PCT No.: PCT/EP2013/002565
§ 371 (c)(1),
(2) Date: Mar. 20, 2015

(87) PCT Pub. No.: WO2014/044353
PCT Pub. Date: Mar. 27, 2014

(65) Prior Publication Data
US 2015/0260748 A1    Sep. 17, 2015

(30) Foreign Application Priority Data
Sep. 21, 2012   (FR) ..................................... 12 58868

(51) Int. Cl.
*G01P 3/44*    (2006.01)
*G01P 3/00*    (2006.01)
(Continued)

(52) U.S. Cl.
CPC .............. *G01P 3/00* (2013.01); *F02D 41/009* (2013.01); *F02D 41/0097* (2013.01);
(Continued)

(58) Field of Classification Search
USPC ............. 73/114.25, 114.49, 115.05; 702/145
See application file for complete search history.

(56) References Cited

U.S. PATENT DOCUMENTS 4,730,255 A    3/1988  Akiyama et al.
7,194,899 B1   3/2007  Chen et al.
(Continued)

FOREIGN PATENT DOCUMENTS

CA       2414025 A1      6/2003
CN     101666281 A       3/2010
(Continued)

OTHER PUBLICATIONS

International Search Report, dated Sep. 30, 2013, from corresponding PCT application.

*Primary Examiner* — Lam Nguyen
(74) *Attorney, Agent, or Firm* — Young & Thompson (57) ABSTRACT

This method includes the following steps: —determining the angular position and the rotational speed for a first point of measurement and a second point of measurement of a engine position sensor, —determining at least one gradient of the rotational speed different from the speed gradient between the two points of measurement of the previous step, —approximating the actual rotational speed curve with respect to the angular position with a polynomial function of degree two, and —carrying out a calculation, in advance, for determining an estimated rotational speed at the predefined position, the position defining a future angular position of the crankshaft, by applying the polynomial function to the
(Continued)

predefined future position. The method can be used to predict engine rotation reversal.

20 Claims, 3 Drawing Sheets

(51) Int. Cl.
| | | |
|---|---|---|
| *F02D 41/00* | (2006.01) | |
| *F02D 41/24* | (2006.01) | |
| *G01P 13/04* | (2006.01) | |
| *G01D 5/00* | (2006.01) | |
| *F02D 41/04* | (2006.01) | |
| *F02N 11/08* | (2006.01) | |

(52) U.S. Cl.
CPC .......... *F02D 41/2416* (2013.01); *G01D 5/00* (2013.01); *G01P 3/44* (2013.01); *G01P 13/045* (2013.01); *F02D 41/042* (2013.01); *F02D 2200/101* (2013.01); *F02D 2200/1012* (2013.01); *F02N 11/0844* (2013.01); *F02N 2200/022* (2013.01); *F02N 2250/04* (2013.01); *F02N 2300/2006* (2013.01)

(56) References Cited

U.S. PATENT DOCUMENTS

| | | | |
|---|---|---|---|
| 7,614,290 B2 * | 11/2009 | Shikama | ............ F02D 41/0097 |
| | | | 73/114.25 |
| 2003/0154774 A1 | 8/2003 | Baeuerle et al. | |
| 2005/0149249 A1 | 7/2005 | McDonald et al. | |
| 2008/0236265 A1 | 10/2008 | Dian et al. | |
| 2010/0107747 A1 | 5/2010 | Rolew et al. | |
| 2010/0223985 A1 * | 9/2010 | Ascher | .................. F02D 41/263 |
| | | | 73/114.49 |
| 2011/0184626 A1 | 7/2011 | Mauritz et al. | |
| 2013/0125636 A1 * | 5/2013 | Cwik | .................. F02N 11/0855 |
| | | | 73/115.05 |
| 2013/0173210 A1 * | 7/2013 | Cwik | .................... G01M 15/04 |
| | | | 702/145 |

FOREIGN PATENT DOCUMENTS

| | | |
|---|---|---|
| DE | 10218641 A1 | 11/2003 |
| DE | 10231081 A1 | 1/2004 |
| DE | 10324858 A1 | 1/2004 |
| DE | 102004045153 A1 | 3/2006 |
| DE | 102007006666 A1 | 11/2007 |
| DE | 102011053559 A1 | 3/2012 |
| EP | 0163246 A2 | 12/1985 |
| EP | 1070964 A2 | 1/2001 |
| EP | 1462638 A1 | 9/2004 |
| EP | 2113646 A1 | 11/2006 |
| EP | 2757248 A1 | 7/2014 |
| FR | 2890690 A1 | 3/2007 |
| JP | 2013209982 A | 10/2013 |
| JP | 2014105649 A | 6/2014 |
| KR | 20080055901 A | 6/2008 |
| RU | 2267644 C2 | 1/2006 |
| TW | 201009187 A | 3/2010 |
| WO | 2006021417 A1 | 3/2006 |
| WO | 2007028584 A1 | 3/2007 |

* cited by examiner

METHOD FOR ESTIMATING THE SPEED OF AN ENGINE IN A PREDEFINED POSITION

BACKGROUND OF THE INVENTION

The present invention relates to a method for estimating the speed of an engine in a predetermined position, more specifically with a view to determining in advance a risk of inversion of the direction of rotation of said engine.

The invention relates in general to internal-combustion engines and more specifically to engines of this type in motor vehicles.

An internal-combustion engine, be it a spark-ignition engine (Otto engine) or a compression-ignition engine (diesel engine), usually runs in a single direction of rotation. However, when the engine stops, before reaching the stop position thereof, the engine turns in one direction then in the other direction in an oscillating movement about the stop position thereof.

DESCRIPTION OF THE RELATED ART

Since the development of systems commonly known as "stop and start" systems, it has become useful to detect the inverse direction of rotation of an engine. Indeed, it is important to determine the position of the stopped engine to enable it to be started more quickly. Document WO 2007/028584 thus relates to a method for determining the inversion of the direction of rotation of the engine. In this document, it is useful to attempt to determine as closely as possible the moment at which the engine starts turning in the inverse direction in order to better estimate the stop position thereof.

If a stop is commanded by the driver, the injection of fuel into the engine is then stopped and the engine stops quickly.

There are however cases in which the inversion of the direction of rotation of the engine is not anticipated, in which case it is possible that a piston of said engine reaches a point just before or close to top dead center thereof and the fuel is then injected into the corresponding combustion chamber (and/or an ignition is commanded). In this case, a combustion occurs and drives the piston, and therefore the engine, in the inverse direction of rotation.

While in the event of the engine turning in the inverse direction during a stop commanded by the driver the forces exerted on the pistons are low, these forces are significant if a combustion drives the engine in the inverse direction of rotation. In this latter case, these significant forces can damage the engine.

Indeed, most modern engines, both diesel engines and spark-ignition engines, include a flywheel made up of two masses joined together by springs to improve driving comfort. Such flywheels are referred to as dual-mass flywheels. One mass of such a flywheel is connected to the crankshaft, and therefore to the pistons, and the other is connected to the transmission (for example primary shaft of the gearbox), and therefore to the vehicle. It is therefore important to avoid overstressing the springs located between the two masses to limit the mechanical stresses on same. It is therefore preferable to avoid all circumstances in which the two masses of the flywheel have inverse directions of rotation.

The undesirable circumstances identified are circumstances in which the engine stalls. The engine can be caused to turn in the inverse direction when the vehicle moves forward. In this case it is important to ensure that the pistons are not subject to significant forces.

All of these stresses that can be exerted between the masses of a dual-mass flywheel have led motor-vehicle manufacturers to make the structure of this type of flywheel more robust, thereby significantly increasing cost, albeit with limited efficiency.

Document EP 1 462 638 relates to a method and apparatus for determining the variation of an engine parameter, in particular the engine speed of the engine, by interpolating a polynomial to a moving window of size w, where w is the number of measurement data being obtained in the window. This document therefore defines the estimated values inside the measurement window w.

The problem at the heart of the present invention is how to prevent any combustion that would drive the engine in the inverse direction of rotation thereof in order to limit the stresses between the masses of a dual-mass flywheel. The original idea of the inventors is therefore to predict the rotational speed of the engine at a predetermined position of same. Indeed, in this way it is possible to anticipate the engine stalling.

On the basis of the issue of the engine stalling, it turns out that predicting the rotational speed of the engine at a given position of same, in particular at low engine speeds, could also be useful when starting the engine, for example to save the starter motor and to stop it once the speed requirements enabling the engine to run under good conditions have been met. When starting, predicting the rotational speed can also be used to adjust the starter motor and to act on the richness of the mixture in the combustion chambers.

This speed prediction can also be used in a vehicle that has both an internal-combustion engine and an electric motor, commonly referred to as a hybrid vehicle, to anticipate the internal-combustion engine stalling and the electric motor starting up (subject to conditions).

SUMMARY OF THE INVENTION

The present invention is therefore intended to provide means to determine in advance a rotational speed of an engine in a predefined position of same. Thus, the invention can then be used for example to predict an inversion of the direction of rotation of the engine, thereby preventing any combustion that would drive the engine in the inverse direction of rotation thereof. It can also be used to manage the engine in other applications, for example for managing the engine at low engine speeds.

For this purpose, the present invention originally proposes a method for estimating the engine speed of an internal-combustion engine at a predefined position of same, said engine comprising:
  a target with teeth that is linked to a crankshaft,
  a sensor cooperating with the teeth, and
  means for managing the engine including means for determining the angular position of the crankshaft, also referred to as the angular position of the engine, and a clock used to determine the time interval between two successive passes of a tooth before the sensor.

According to the present invention, said method includes the following steps:
  determination of the angular position and of the rotational speed for a first measurement point and a second measurement point of the sensor,
  determination of at least one gradient of the rotational speed other than the gradient of the speed between the two measurement points in the previous step, approximation of the real curve of rotational speed in relation to the angular position using a polynomial function of degree 2, and calculation in advance of an estimated rotational speed at the predefined position, this latter being a future angular position of the crankshaft, by application of the polynomial function at said predefined future position.

The method described here makes it possible to determine in advance an engine speed at a future angular position of the engine. This estimate is valid for a interval in which the speed increases or for a interval in which the speed decreases.

Originally, the estimate made is a function in which the variable is the angular position of the engine (and not a temporal variable). This makes it possible to simplify the calculations and therefore to limit the load on the microprocessor used for said calculations.

The points chosen are any points on the curve. They are nonetheless preferably, firstly, quite close to one another and, secondly, not too far from the point for which the speed estimate is to be made.

In such a method, to take the last speed gradient into account, the first measurement point and the second measurement point are measurement points corresponding to sensor measurements for two successive teeth.

Advantageously, to take the variation in the speed gradient into account, the approximation of the rotational speed in relation to the angular position is determined as the curve of degree 2 passing through the two measurement points and having a speed gradient variation defined on the basis of the measured speed gradient. In this case, it is advantageous to calculate the polynomial estimate bearing in mind that the speed gradient variation is a constant corresponding to the variation in the speed gradient between, firstly, the speed gradient resulting from the first measurement point and from the second measurement point and, secondly, the distinct speed gradient determined. By adapting the place on the curve where the speed gradient is determined (the one other than the speed gradient between the first measurement point and the second measurement point), it is possible to take into account either a speed gradient variation that is very close to the measurement points, or further away. This speed gradient variation is done with measurement points, at least one of which is different from the first measurement point and from the second measurement point. The measurement points used for this speed gradient variation may be signals supplied by the sensor for two neighboring teeth, but also for two more or less separated teeth.

The present invention also proposes a method for predicting an inverse rotation of an engine, characterized in that it includes the following steps:
estimate of the engine speed at a predetermined angular position, as proposed above,
comparison of the engine speed at a predetermined threshold as a function of the angular position at which the angular speed was estimated, and
prediction of an inverse rotation if the estimated speed is below the predetermined threshold.

In this method, the engine speed is for example estimated close to a top dead center of the engine, i.e. at less than 10° from this top dead center, and preferably at said top dead center of the engine. The predetermined threshold is then for example between 240 and 360 rpm (i.e. between 8 m and 12 m rad/s).

The present invention also relates to a method for managing an engine, including the following steps:

prediction of an inverse rotation of an engine as proposed above,
if an inverse rotation is predicted while no starter device is active in the engine, the following combustion is inhibited.

To inhibit the following combustion, the engine management device acts on the fuel injection means to prevent the following injection (or a succession of injections in a very short space of time) in the case of a diesel engine, and for a spark-ignition engine (Otto engine), the fuel injection and/or the ignition of the engine is acted upon.

Such a method for managing an engine may also include the following step:
detection of any inverse rotation of the engine and, if such inverse rotation is detected, the prediction method is ended, otherwise it is assumed that the engine is being driven in rotation and the prediction method is continued.

Finally, the present invention also relates to a device for managing an engine characterized in that it includes means for implementing each of the steps of a method as described above.

BRIEF DESCRIPTION OF THE DRAWING FIGURES

The details and advantages of the present invention are set out in greater detail in the description below, provided with reference to the schematic drawing attached in which.

DETAILED DESCRIPTION OF THE INVENTION

The present description relates to a diesel or spark-ignition (Otto) internal-combustion engine. Conventionally, such an engine includes an engine block, in which are machined cylinders that are closed at one extremity thereof by a cylinder head. The cylinders contain pistons linked by means of a piston rod to a crankshaft. A flywheel is mounted on one extremity of the crankshaft. The position of the crankshaft determines the position of the engine, i.e. if this position is known, the position of all of the pistons in the corresponding cylinders and the positions of numerous other mechanical parts of the engine are known. As the crankshaft does not have any degree of freedom in rotation, the position of the engine is then determined by an angular value, referred to as the (angular) position of the engine. Furthermore, it is assumed in the remainder of the description that the engine in question has a four-stroke cycle. Thus for each cylinder, a complete combustion cycle is performed once the crankshaft has completed two revolutions. The position of the engine can then be defined modulo 720°, i.e. two complete 360° revolutions.

To determine the position of the engine, it is common to provide the crankshaft with a target with teeth distributed regularly at an angular periodicity P, a starting point being defined by a long tooth, corresponding for example to two teeth and to the interval between same, or by the absence of one or two teeth. A position sensor is associated with the target and counts the teeth passing before it. The pass time between two successive teeth is also measured using the sensor and a clock built into the electronic management system of the engine. It is henceforth assumed that the number of teeth N corresponds to 360/P. Thus for teeth distributed regularly at an angular pitch of 6°, there are considered to be 60 teeth and the singularity defining the starting point is therefore not taken into account.

The present invention is more specifically intended to be implemented in engines having a dual-mass flywheel. Such a flywheel has two masses joined together by springs. One mass is rigidly connected to the crankshaft and the other is rigidly connected to a transmission, which enables it to transmit the energy produced in the engine to the wheels, referred to as the driving wheels, of the vehicle. The invention can however also be implemented with a "conventional" flywheel with a single turning mass that is associated with a clutch.

Figure 1:
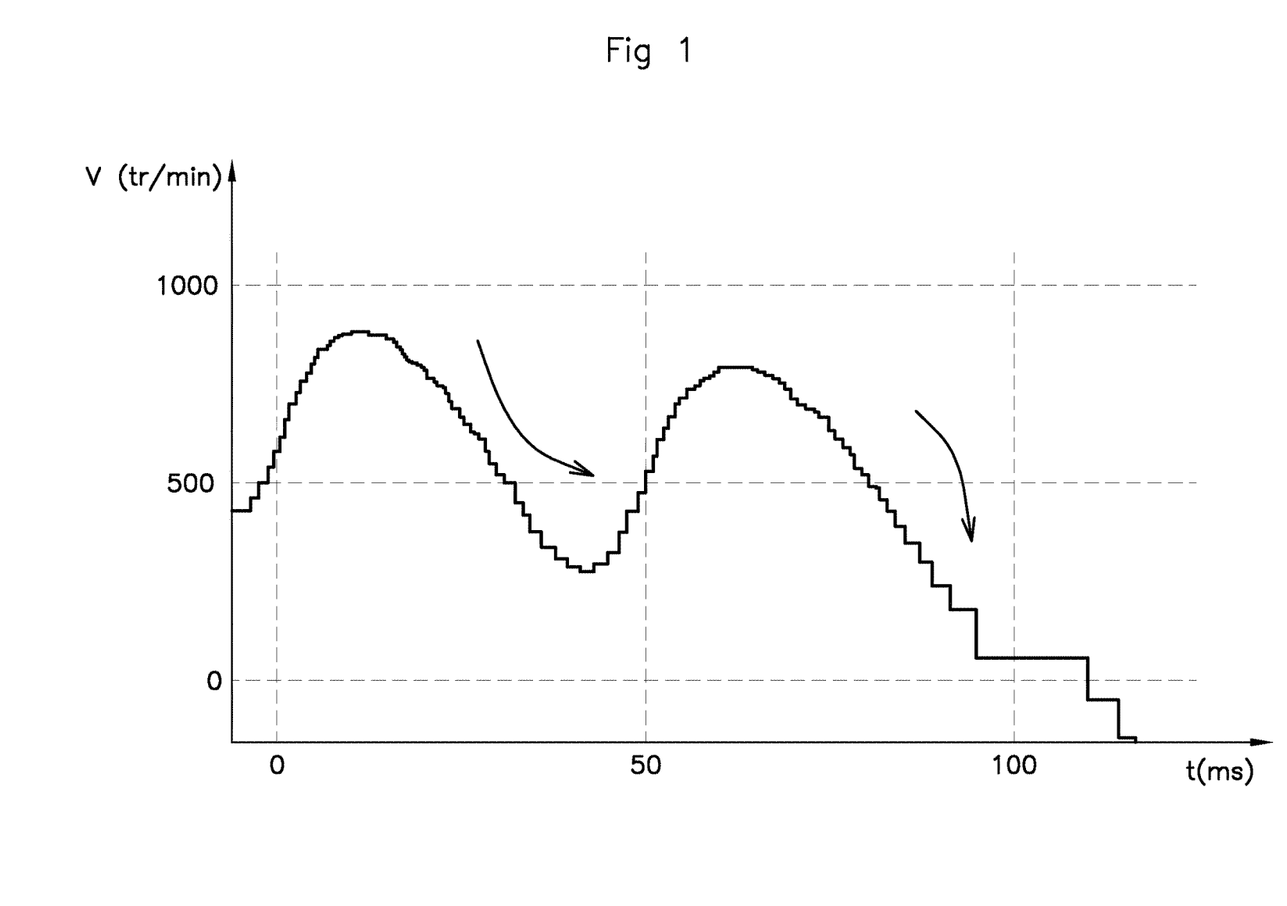
FIG. 1 is a graph showing the rotational speed of an engine in relation to the time at which it stalls.

FIG. 1 shows the rotational speed V of an engine, expressed as revolutions per minute (rpm), as a function of the time t (in seconds "s" or milliseconds "ms") just before the engine stalls.

The curve shown is stepped since the measurement points are discrete. The x-axis is given directly by the position sensor while the speed is obtained by measuring the time separating two passes of the teeth before this sensor. Since the pitch between two teeth is constant, the speed is inversely proportional to the time separating detection of two successive teeth.

It can be seen in FIG. 1 that the speed measured becomes negative, which means that the engine (the crankshaft) is turning in the direction inverse to the normal direction of rotation thereof. This speed becomes negative before a top dead center, but this negative speed is in fact only detected after this top dead center.

Figure 2:
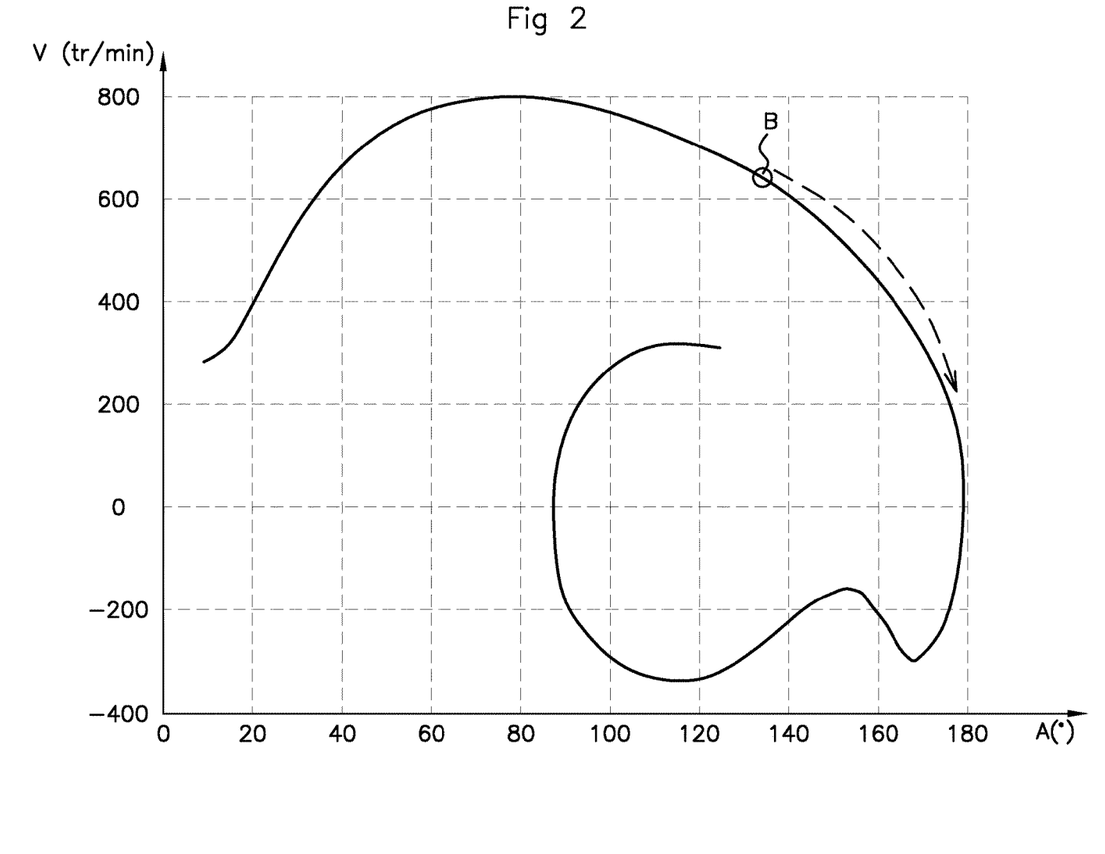
FIG. 2 is another representation of the speed of the engine in relation to the angular position thereof when a four-cylinder engine is stalling, the x-axis of the curve being represented modulo 180°.

FIG. 2 shows the speed variation in another way when the engine in question stalls. In this case, the engine is a four-stroke engine in which a combustion occurs every 180°. This type of engine has been chosen arbitrarily and for purely illustrative, nonlimiting purposes, and it will be clear to the person skilled in the art that the invention can also be applied to engines with a different number of cylinders. In this figure, an angular range of 0° to 180° has been shown. In the case of a four-cylinder engine, two pistons reach top dead center at 180°, one following the exhaust stroke in the corresponding combustion chamber and the other following compression of the air (diesel engine) or of the air mixture (Otto engine) in the corresponding combustion chamber. When the engine stalls, the piston at the end of the compression phase does not reach top dead center and the compressed fluid in the corresponding chamber pushes it backwards. The piston then drives the crankshaft backwards.

If the engine management device does not know that the piston is moving backwards and driving the crankshaft in inverse rotation, it will command a fuel injection and/or an ignition as if the engine were continuing to run in the normal direction of rotation thereof. If the compression in the corresponding combustion chamber is sufficient, a combustion will take place and will drive the engine in the inverse direction of rotation thereof. This combustion generates significant stresses in the engine that are potentially damaging, in particular for a dual-mass flywheel.

The present invention originally proposes determining the rotational speed of an engine in advance. This makes it possible to inform the engine management device in advance of any anticipated inverse rotation of the engine. Such predetermination of the rotational speed of the engine could also be used to manage injection and/or ignition, for example when starting the engine or more generally at low engine speeds.

In FIG. 2, the idea at the heart of the present invention is to use the speeds and speed variations to determine, at a point B, a projection of the rotational speed for a future angular position, for example at the next top dead center or close thereto.

A calculation for determining the rotational speed of the engine in question is provided below in the description. As mentioned above, it is assumed in this case that the engine is an engine with four cylinders. Furthermore, the calculation will be performed at the end of the compression phase.

Originally, the rotational speed V of the engine is not determined as a function of a time variable, but as a function of the angular position A of the engine.

During the compression phase (from 0° to 180° for a four-cylinder engine), the engine is essentially braked since the forces exerted on the pistons oppose the movement thereof. The pistons then need to have enough energy, and therefore a speed corresponding to a sufficient rotational speed, to pass the following top dead center.

The present invention proposes approximating the rotational speed V using a polynomial function of degree 2 in relation to the angular position A of the engine.

In this case, the variation in the gradient of the rotational speed is a constant in the forward direction of rotation. Consequently:

$$V''(A)=a$$

in which a is a real constant.

Integrating this formula in relation to the angular position gives the following:

$$V'(A)=aA+b$$

in which b is a real constant.

Integrating again gives the following:

$$V(A)=\tfrac{1}{2}aA^2+bA+c \tag{1}$$

in which c is a real constant.

It is therefore useful to determine the constants a, b and c to make it possible to determine the polynomial function that will make it possible to best estimate the rotational speed of the engine in advance.

A first option is to take the last three measurements made and to determine the curve of degree 2 passing through these three points. The results obtained with the real measurements do not enable a good and robust prediction to be made, and this option has been discarded.

It is proposed here, in a preferred embodiment to be taken into account, for calculating the constants a, b and c:

the last measurement point to take account of the last speed measured, the penultimate measurement point to take account of the last speed gradient, and a speed gradient measured previously to take account of the variation in the speed gradient.

This results in the following equations:

$$a=V''(A) \tag{2}$$

$$V(A_n)=\tfrac{1}{2}aA_n^2+bA_n+c \tag{3}$$

$$V(A_{n-1})=\tfrac{1}{2}aA_{n-1}^2+bA_{n-1}+c \tag{4}$$

The speed gradient corresponds to the variation in the speed divided by the variation in angular position, i.e. $V'(A)=\Delta V/\Delta A$.

The speed gradient calculated using two successive measurement points corresponds to the (approximate) speed gradient at the midpoint between the two measurement points considered. However, given that the measurement has to be taken at the point n to determine the speed gradient at the midpoint between the two measurement points (n−1) and n, this speed gradient shall hereinafter be referred to as $V^*(A_n)$. Consequently:

$$V^*(A_n)=[V(A_n)-V(A_{n-1})]/(A_n-A_{n-1})$$

However, two successive measurement points correspond to the passing of two successive teeth that are separated by a pitch P. Consequently:

$$V'(A_n)=[V(A_n)-V(A_{n-1})]/P \quad (5)$$

Equally:

$$V''(A_n)=[V'(A_n)-V'(A_{n-1})]/P: \quad (6)$$

as can be seen above, in this case this is the constant a (see equation 2 above).

In this case, $V''(A_n)$ has been calculated using three successive measurement points (n−2), (n−1) and n, the first two points being used to calculate $V'(A_{n-1})$ and the last two being used to calculate $V'(A_n)$.

To take account of the variation in the speed gradient over a longer interval, $V''(A_n)$ could for example be taken as the variation in the speed gradient between a point (n−f) and the point n.

This gives the following:

$$V''(A_n)=[V'(A_n)-V'(A_{n-f})]/P \times f \quad (7)$$

This value is then selected for the constant a. It can be seen that equation 7 corresponds to equation 6 for f=1.

Knowing the constant a, it is possible to deduce the value of the constant b, for example by determining the difference between equations 3 and 4. This gives the following:

$$V(A_n)-V(A_{n-1})=[\tfrac{1}{2}aA_n^2+bA_n+c]-[\tfrac{1}{2}aA_{n-1}^2+bA_{n-1}+c]$$

$$V(A_n)-V(A_{n-1})=\tfrac{1}{2}a(A_n^2-A_{n-1}^2)+b(A_n-A_{n-1})$$

in which $P=A_n-A_{n-1}$
Consequently:

$$b=[V(A_n)-V(A_{n-1})]/P-a/2(A_n+A_{n-1}) \quad (8)$$

Since a and b are known, the constant c can be deduced from one of equations 3 or 4. This gives for example:

$$c=V(A_n)-\tfrac{1}{2}aA_n^2-bA_n \quad (9)$$

Integrating the three constants just calculated into the polynomial formula corresponding to equation 1, and simplifying, gives the following:

$$V(A)=V(A_n)+[(V(A_n)-V(A_{n-1}))(A-A_n)/P]+[(V(A_n)-V(A_{n-1}))-(V(A_{n-f})-V(A_{n-f-1}))](A-A_n)(A-A_n+P)/2fP^2 \quad (10)$$

This formula is useful for angular ranges in which the speed gradient does not change sign, i.e. for example before reaching a top dead center.

It is assumed in this case that the engine is continuing to run in the normal direction of rotation thereof. If the engine starts running backwards, then formula 10 would overestimate the speed.

Figure 3:
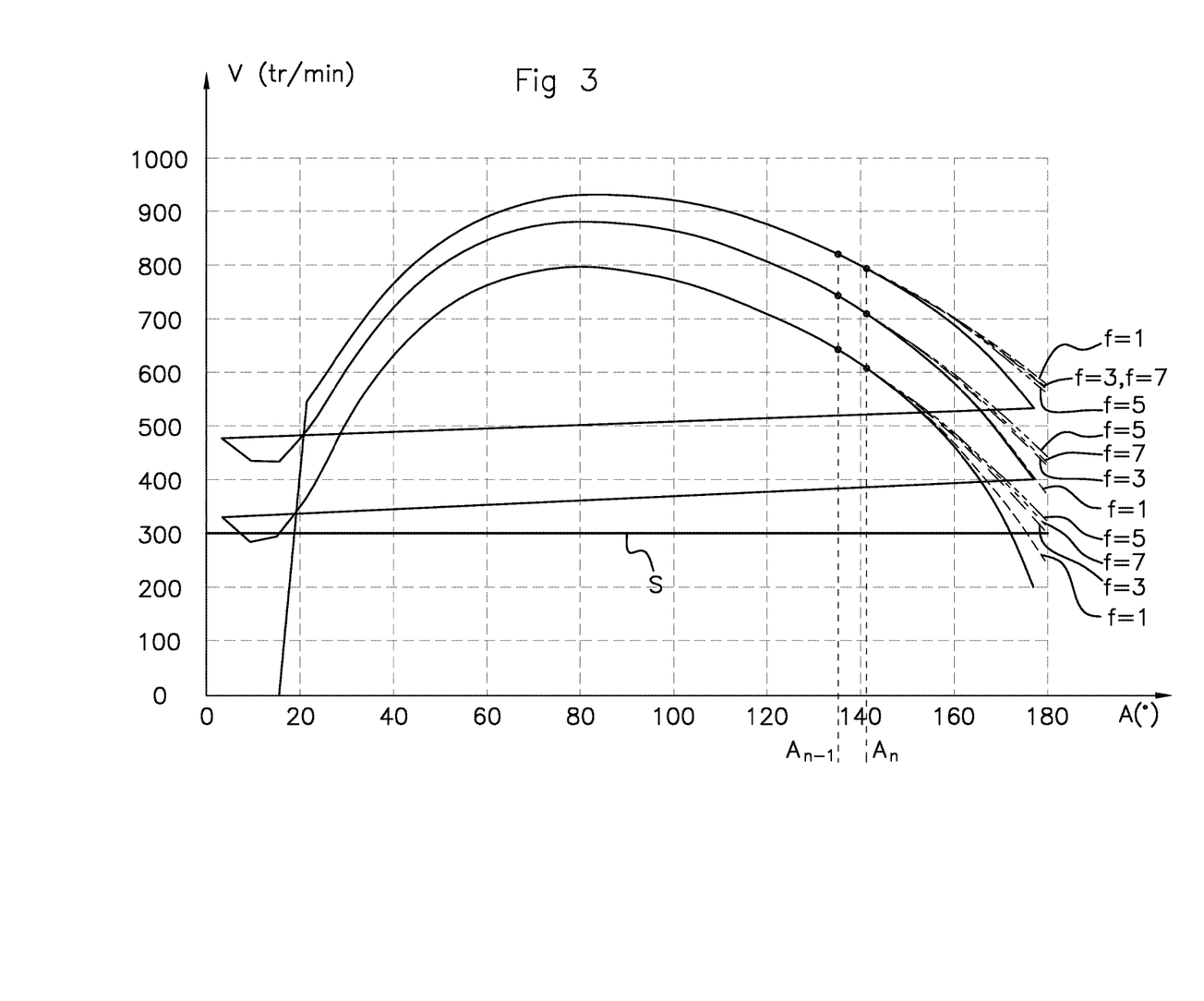
FIG. 3 is a graph like the one in FIG. 2 showing different embodiments of the present invention.

FIG. 3 is an illustration of curves obtained with different values of "f". In this figure, the curve shown with an unbroken line corresponds to the speed of the engine as a function of the angular position modulo 180° thereof. The curves shown using dotted lines show the speed estimate curves with different values for f. It can be seen in this figure that the speed estimated by the polynomial function is overestimated. It can also be seen that, if the engine does not stall (two higher estimates), the curves corresponding to the estimated speed are very close to the measured speed curve (unbroken line) since if the engine is going to stall and run in the inverse direction (third set of curves shown using dotted lines, beneath the first two) the speed estimate is further away from the measured curve.

The estimate of the rotational speed of the engine is used in this case to attempt to predict whether the pistons of the engine have enough kinetic energy to pass the following top dead center. It should be noted here, as can be seen for example in FIG. 3, that the rotational speed of the engine is not lowest at top dead center, but shortly after this position.

According to the measurements taken, it is generally noted for different internal-combustion engines that if the rotational speed is greater than a threshold S (FIG. 3) around 300 rpm when (at least) one piston of the engine is at top dead center, then the engine will continue to run in the normal direction of rotation thereof without going backwards.

It is therefore proposed by the present invention to determine, before a piston arrives at a top dead center, the (estimated) speed of said piston when it passes said top dead center.

Intuitively, the calculation must be performed just before top dead center is reached. The calculation may for example be made between 5° and 80° before top dead center, preferably between 10° and 40° before top dead center.

Once the speed at top dead center has been estimated, the estimated (calculated) speed is compared to the threshold S. If the estimate is below the threshold, the risk of inverse rotation occurring is very high. In this case, the invention proposes inhibiting the injection of fuel and/or the following ignition command that is scheduled for the combustion chamber in which an air mix is compressed.

This inhibition is not carried out in certain cases. Indeed, it is assumed that the engine is not in starting phase and that the starter motor thereof is therefore not in operating mode.

Subsequently, it can be checked whether or not there has been inverse rotation. There are different means known to the person skilled in the art for detecting such inverse rotation (for example the method described in document WO-2007/028584 cited in the preamble of the present document).

If an inverse rotation is detected after prediction of this inverse rotation and inhibition of a combustion, it can be deduced that the prediction was reliable and the inhibition of the combustion thereby helped to protect the engine, and more specifically the dual-mass flywheel thereof. The engine then stops and the prediction process can be completed.

In the opposite case, in which no inverse rotation is detected, it can be assumed that an external force has driven the engine. This is notably the case when the vehicle drives the engine in rotation. It is then beneficial to continue the prediction method for the next pass or passes at top dead center.

Under certain conditions, the engine management system commands calculation of the speed at top dead center. The calculation can be triggered in the lower layers, also commonly referred to as the basic software (BSW) of the management system. For a given engine, several different parameters are set. Thus in formula 10, the pitch P is a constant for each engine. Equally, once the strategy has been defined, the values $A_n$ and $A-A_n$ are constants. The calculation can then for example be triggered when the tooth of the target corresponding to 160° ($=A_n$) passes in front of the sensor. If the speed is estimated at top dead center (i.e. 180°), then $A-A_n=20°$. Equally, the value f is predetermined as a function of the characteristics of the engine.

The simplified formula 10 is memorized and run by Applicative SoftWare (ASW). This part of the management system, in which the speed estimate is carried out, is sometimes referred to as the "upper layers" of the system.

The tests carried out show that the management system has around 10 ms (i.e. 10 $10^{-3}$ s), or 30 ms or more, between the instant at which the speed estimate at top dead center is known and the injection of fuel and/or the ignition command needs to occur. This time is sufficient to command the inhibition of the combustion planned close to the approaching top dead center.

Naturally, depending on the intended application of the prediction of the rotational speed, this prediction will only be made under certain conditions. If it is intended to detect inverse rotation of the engine in advance, the calculation will for example only be performed if for example the engine speed is less than idling engine speed.

The present invention is original in a number of different ways. Firstly, it proposes predicting a rotational speed. This makes it possible to anticipate any inverse rotation of the engine. In the known prior art, inverse rotation is usually detected more or less quickly, but is not anticipated as described above. Then, to predict the rotational speed, it has been decided to express this speed in relation to the angular position of the engine (and not in relation to a time variable). This facilitates the calculations and makes it possible to limit the calculation load on the corresponding processor. Finally, the decision to approximate the speed curve using a polynomial function of degree 2 and the means of determining the corresponding constants in consideration of the speed gradient and of the variation thereof is also original.

The present invention makes it possible to detect any backwards rotation of the engine well in advance. An empirical rule states that if a tooth pass is at least 1.3 times longer than the preceding pass, then a backwards rotation should be anticipated. The invention makes it possible to determine, well before application of this empirical rule, whether a backwards rotation should be anticipated.

The simulations carried out have demonstrated that approximating with a polynomial function of degree 2 works very well for different types of stalling that may occur. Indeed, the variations in the rotational speed of the engine before stalling differ depending on the conditions under which the stall occurs. Stalling may occur when the vehicle starts moving forwards. If the driver makes a mistake and engages second or third gear instead of first gear, the engine will not be able to drive the vehicle and it will stall. It is also possible to stall when the vehicle is running in second gear and then fifth gear is engaged instead of third gear. In this case, the engine can also be caused to stall. Conversely, in deceleration phase, if the driver forgets to select the lower gear, the engine may be caused to run at a speed lower than the idling engine speed thereof and stall. Whenever the rotational speed of the engine decreases, it was found that the approximation performed was good and made it possible to reliably predict an inverse rotation of the engine.

Naturally, the present invention is not limited to the preferred embodiment described above and the variants thereof. It also concerns all of the alternative embodiments available to the person skilled in the art.

The invention claimed is:

1. A method for estimating the engine speed of an internal-combustion engine at an angular position of the engine corresponding to a current point (A), in advance for a future engine angular position representing a predefined position of same, said engine comprising:
   a target with teeth that is linked to a crankshaft,
   a sensor cooperating with the teeth, and
   means for managing the engine including means for determining the angular position of the crankshaft, also referred to as the angular position of the engine, and a clock used to determine the time interval between two successive passes of a tooth before the sensor, the method comprising the following steps:
   a first step of i) determining the angular position for a first measurement point ($A_n$) and a second measurement point ($A_{n-1}$) of the sensor and ii) of determining a rotational speed for the first measurement point ($A_n$) and the second measurement point ($A_{n-1}$) of the sensor,
   a second step of determining a gradient (V'(A)) of the rotational speed between the first and second measurement points ($A_n$, $A_{n-1}$) determined in said first step,
   a third step of determining at least one gradient of the rotational speed (V'($A_{n-j}$)) between two further measurement points, at least one of the two further measurement points being different from the first measurement point ($A_n$) and the second measurement point ($A_{n-1}$), to thereby obtain at least one other gradient of the rotational speed (V'($A_{n-j}$)) in addition to the gradient V'(A) of the speed between the first and second measurement points ($A_n$, $A_{n-1}$) determined in said second step,
   using the determined gradient (V'(A)) of the rotational speed between the first and second measurement points ($A_n$, $A_{n-1}$) and the determined at least one other gradient of the rotational speed (V'($A_{n-j}$)) between the two further measurement points, approximating the real curve of rotational speed in relation to the angular position using a polynomial function of degree 2, and
   using the approximated real curve of rotational speed, calculating in advance an estimated rotational speed at the predefined position, the predefined position being a future angular position of the crankshaft, by application of the polynomial function at said predefined position.

2. The method as claimed in claim 1, wherein the first measurement point ($A_n$) and the second measurement point ($A_{n-1}$) are measurement points corresponding to sensor measurements for two successive teeth.

3. The method as claimed in claim 2, wherein the approximation of the rotational speed in relation to the angular position is determined as the curve of degree 2 passing through the first and second measurement points ($A_n$, $A_{n-1}$) and having a speed gradient variation defined on the basis of the measured speed gradient.

4. A method for predicting an inverse rotation of an engine, further comprising the following steps:
   estimating the engine speed at an angular position predetermined using a method according to claim 2,
   comparing the engine speed at a predetermined threshold as a function of the angular position at which the angular speed was estimated, and
   predicting an inverse rotation after the estimated speed is below the predetermined threshold.

5. The prediction method as claimed in claim 4, wherein the engine speed is estimated at at less than 10° from a top dead center of the engine.

6. The prediction method as claimed in claim 5, wherein the predetermined threshold is between 240 and 360 rpm (i.e. between $8\pi$ and $12\pi$ rad/s).

7. A motor management method, further comprising the following steps:

predicting an inverse rotation of an engine as claimed in claim 4, and after an inverse rotation is predicted while no starter device is active in the engine, the following combustion is inhibited.

8. The method for managing an engine as claimed in claim 7, further comprising the following step:

detecting any inverse rotation of the engine and, after such inverse rotation is detected, the prediction method is ended, otherwise it is assumed that the engine is being driven in rotation and the prediction method is continued.

9. The method as claimed in claim 1, wherein the approximation of the rotational speed in relation to the angular position is determined as the curve of degree 2 passing through the first and second measurement points ($A_n$, $A_{n-1}$) and having a speed gradient variation defined on the basis of the measured speed gradient.

10. The method as claimed in claim 9, wherein the polynomial estimate is calculated bearing in mind that the speed gradient variation is a constant corresponding to the variation in the speed gradient between, firstly, the speed gradient resulting from the first measurement point and from the second measurement point and, secondly, the distinct speed gradient determined.

11. A method for predicting an inverse rotation of an engine, further comprising the following steps:

estimating the engine speed at an angular position predetermined using a method according to claim 10, comparing the engine speed at a predetermined threshold as a function of the angular position at which the angular speed was estimated, and predicting an inverse rotation after the estimated speed is below the predetermined threshold.

12. A method for predicting an inverse rotation of an engine, further comprising the following steps:

estimating the engine speed at an angular position predetermined using a method according to claim 9, comparing the engine speed at a predetermined threshold as a function of the angular position at which the angular speed was estimated, and predicting an inverse rotation after the estimated speed is below the predetermined threshold.

13. A method for predicting an inverse rotation of an engine, further comprising the following steps:

estimating the engine speed at an angular position predetermined using a method according to claim 1, comparing the engine speed at a predetermined threshold as a function of the angular position at which the angular speed was estimated, and predicting an inverse rotation after the estimated speed is below the predetermined threshold.

14. The prediction method as claimed in claim 13, wherein the engine speed is estimated close to a top dead center of the engine, i.e. at less than 10° from this top dead center.

15. The prediction method as claimed in claim 14, wherein the predetermined threshold is between 240 and 360 rpm (i.e. between $8\pi$ and $12\pi$ rad/s).

16. A motor management method, further comprising the following steps:

predicting an inverse rotation of an engine as claimed in claim 15, and after an inverse rotation is predicted while no starter device is active in the engine, the following combustion is inhibited.

17. A motor management method, further comprising the following steps:

predicting an inverse rotation of an engine as claimed in claim 14, and after an inverse rotation is predicted while no starter device is active in the engine, the following combustion is inhibited.

18. A motor management method, further comprising the following steps:

predicting an inverse rotation of an engine as claimed in claim 13, and after an inverse rotation is predicted while no starter device is active in the engine, the following combustion is inhibited.

19. The method for managing an engine as claimed in claim 18, further comprising the following step:

detecting any inverse rotation of the engine and, after such inverse rotation is detected, the prediction method is ended, otherwise it is assumed that the engine is being driven in rotation and the prediction method is continued.

20. A device for managing an engine, comprising means for implementing each of the steps of a method as claimed in claim 1.

* * * * *